(No Model.) 3 Sheets—Sheet 2.
T. B. PURVES & T. C. CRAVEN.
DRAW BAR.
No. 271,269. Patented Jan. 30, 1883.
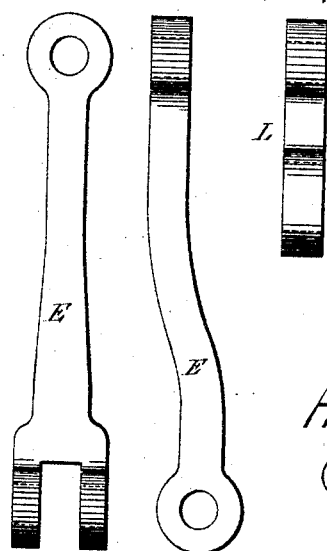
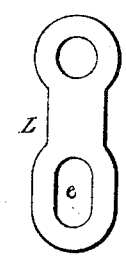
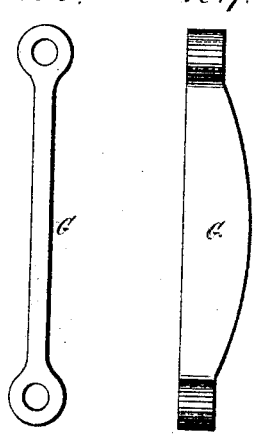
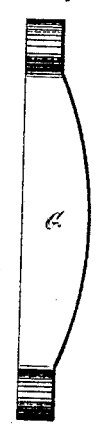
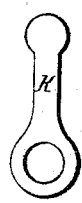
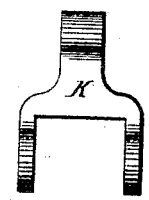
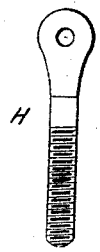
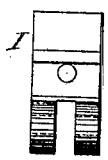
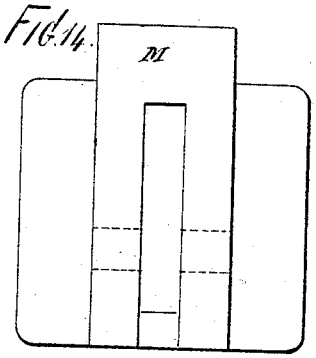
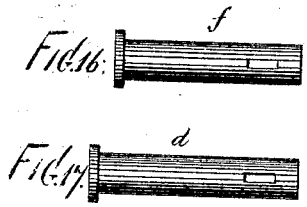
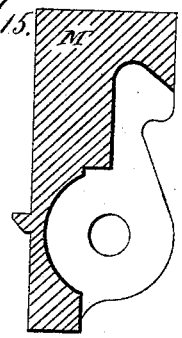
Witnesses:
John Buckler
F. W. Hanaford
Thos. B. Purves and
Thos. C. Craven,
Inventors.
By Thos. Osgood
Attorney.

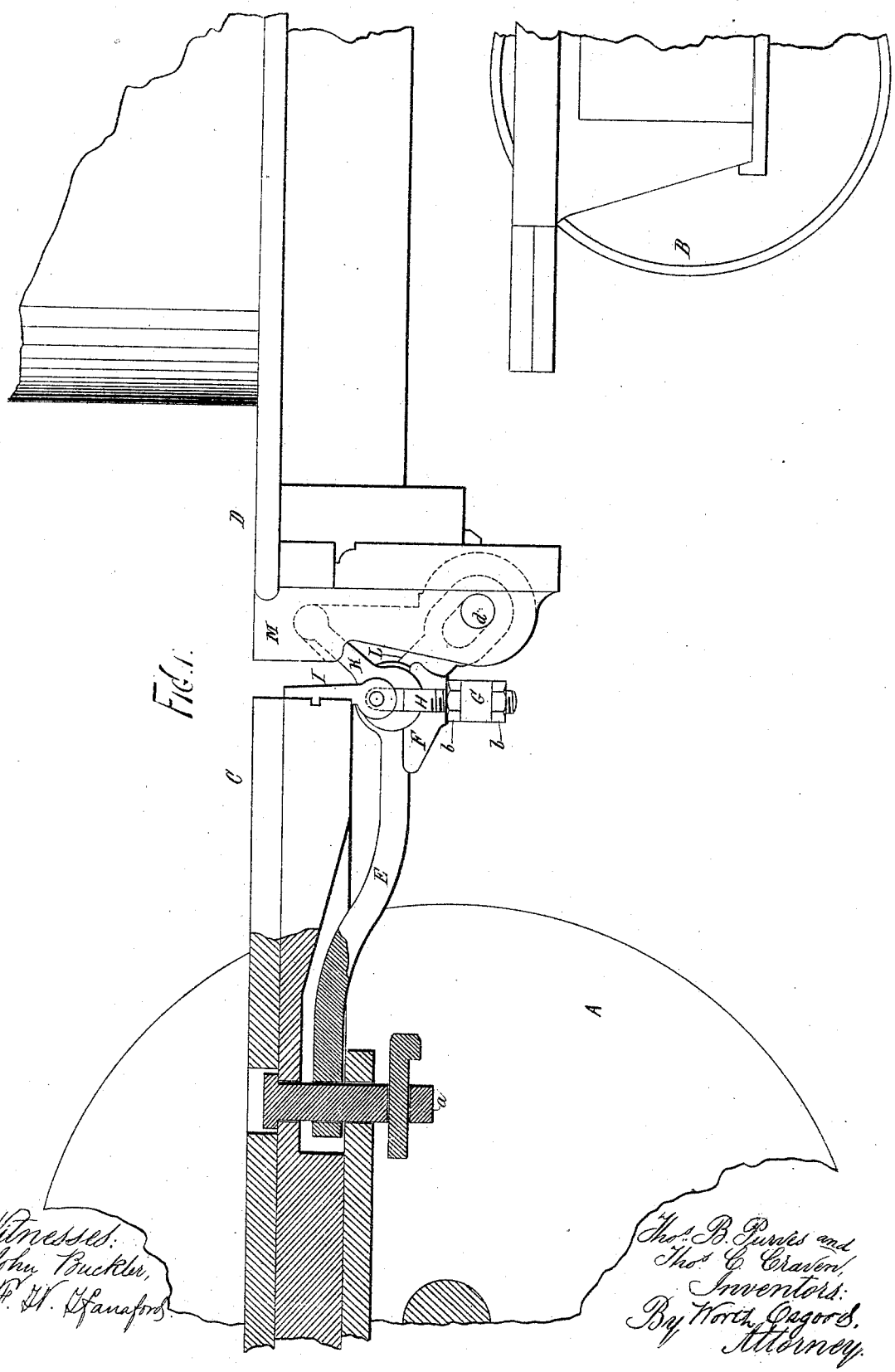

(No Model.) 3 Sheets—Sheet 3.
T. B. PURVES & T. C. CRAVEN.
DRAW BAR.
No. 271,269. Patented Jan. 30, 1883.
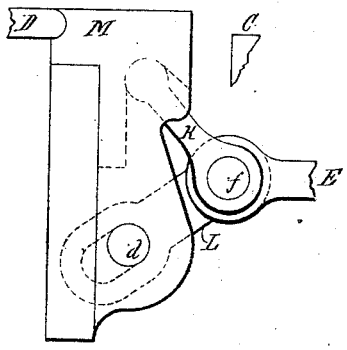
FIG. 18.
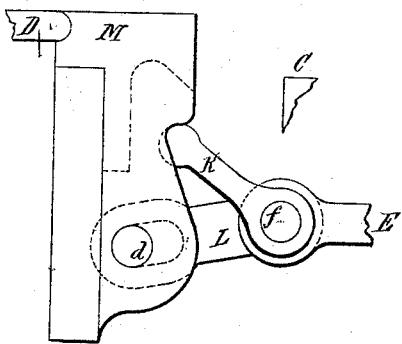
FIG. 19.
FIG. 21.
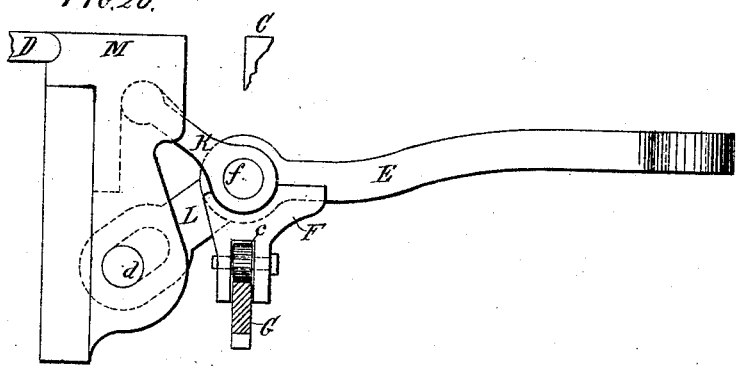
FIG. 20.
Witnesses:
John Buckler,
F. W. Hanaford.
Thos. B. Purves and
Thos. C. Craven,
Inventors:
By Word Osgood,
Attorney.

UNITED STATES PATENT OFFICE.

THOMAS B. PURVES AND THOMAS C. CRAVEN, OF GREENBUSH, NEW YORK.

DRAW-BAR.

SPECIFICATION forming part of Letters Patent No. 271,269, dated January 30, 1883.

Application filed November 10, 1882. (No model.)

*To all whom it may concern:*

Be it known that we, THOMAS B. PURVES and THOMAS C. CRAVEN, of Greenbush, county of Rensselaer, and State of New York, have jointly invented certain new and useful Improvements in Draw-Bars, of which following is a full, clear, and exact description, reference being had to the accompanying drawings, and to the letters of reference marked thereon.

Our invention has relation to draw-bars for locomotives, especially those which are employed for connecting the locomotive and the tender, though, as will be readily perceived, the improvements might be applied upon draw-bars in other situations, the same principles of operation being preserved.

The object of our invention is primarily to increase the weight upon the driving-wheels of the locomotive (and thereby increase the friction or "hold" upon the track) by applying the weight of the forward part of the tender to the weight of the locomotive, and to do this only when the locomotive is pulling or backing hard; and secondary objects are to produce a simple, effective, and readily applicable draw-bar attachment, which is not liable to get out of order, which will conform to all the usual movements of the engine and tender, and which will be automatic in its action. To accomplish this our improvements involve certain novel and useful peculiarities of construction, principles of operation, and relative arrangements or combinations of parts, all of which will be herein first fully described, and then pointed out in the claims.

In the accompanying drawings, forming part of this specification, Figure 1 is a side elevation and partial section, showing the application of the improved attachments between a locomotive and its tender, the two decks being on the same level, indicating that locomotive is pulling or backing only its usual load and not requiring the weight of the tender to be added. Fig. 2 is a plan, and Fig. 3 an edge, view of the main part of the draw-bar detached from other parts. Figs. 4 and 5 represent the edge and face of the draw-link; Figs. 6 and 7, the edge and face of the supporting-yoke; Figs. 8 and 9, the edge and face of the strut; Figs. 10 and 11, the face and edge of one of the pendants for sustaining the yoke; Figs. 12 and 13, the edge and face of the hinge-plate by which the pendants are hung upon the locomotive. Fig. 14 is a front elevation, and Fig. 15 a central vertical section, of the buffer applied upon the tender; and Figs. 16 and 17 are elevations showing the knuckle-pin and the buffer-pin. Figs. 18, 19, and 20 are side views, intending to show the relative positions automatically assumed by the working parts when the locomotive is backing hard, pulling hard, and pulling or backing only its ordinary load. Fig. 21 is a rear view of the parts applied upon the locomotive.

In all these figures like letters of reference, wherever they occur, indicate corresponding parts.

A is the rear driving-wheel of the locomotive; B, the front wheel of the tender; C, the deck of the locomotive, and D the deck of the tender.

The main part of the draw-bar E is connected with the locomotive by any suitable pin, as at *a*, strong enough for the purposes and permitting the bar to vibrate.

The saddle F sustains the outer end of bar E, and is in turn supported from the rear of the locomotive upon the yoke G, sustained by the pendants H H, hinged in the hinge-plates I I, as plainly shown at Fig. 21. The yoke is made adjustable upon the pendants by means of suitable nuts, as at *b b*, whereby the height of the traveling saddle may be regulated. Any equivalent means of making this adjustment may be adopted. The saddle F moves laterally upon the yoke, being provided with friction-rollers *c c*, so that as the tender and locomotive vibrate the connecting parts will adjust themselves accordingly.

K is the backing-strut, hinged or jointed to the bar E; and L is the draw-link, also jointed to the bar E.

M is the buffer, applied upon the tender or upon the vehicle next following the locomotive. It is recessed to receive the end of the backing-strut and also the end of the draw-link, the latter being connected with the buffer by the removable pin *d* and having an elongated slot, as at *e*. The pin *f* passes through the eyes in the end of bar E, through the end of the draw-link, and through the eyes in the end of the backing-strut, forming the hinge between these three parts.

When the locomotive is pulling or backing its ordinary load the decks C and D maintain positions about on a level, as indicated in Figs. 7 and 20, the draw-link and the backing-strut assuming the position shown in said figures. When the locomotive is backing hard or against a heavier load than usual the backing-strut elevates the adjacent end of the tender, as indicated in Fig. 18, and thus throws a part of its weight upon the driving-wheels of the locomotive, thereby increasing the hold or "bite" of the drivers upon the track and enabling the locomotive to move a heavier load. When pulling hard the backing-strut drops down and the draw-link tends to elevate the adjacent end of the tender, as indicated in Fig. 19, affording like results.

It will be understood that the saddle F constitutes a supporting piece or block, by use of which (or an equivalent support) the part of the draw-bar connected with the locomotive is maintained in such relation to the locomotive that the strut or the link may operate as above set forth.

These operations are perfectly automatic and require no attention on the part of the engineer. The height of the yoke being properly regulated, the attachments will tend to elevate the tender as soon as sufficient resistance is applied thereto. The parts are all simple and durable, and the whole arrangement well adapted for the purposes or objects of the invention, as previously stated.

Having now fully described our invention, what we claim as new, and desire to secure by Letters Patent, is—

1. A draw-bar for locomotives, composed of two parts, one part for connection with the locomotive, sustained by a support between its extremities, and the other for connection with the tender or other vehicle, the parts being united with each other by a movable joint, substantially as and for the purposes set forth.

2. In combination with a draw-bar for locomotives, the strut jointed thereon, and a supporting piece or block, substantially as and for the purposes set forth.

3. In combination with a draw-bar for locomotives, the draw-link jointed thereon, and a supporting piece or block, substantially as and for the purposes set forth.

4. In combination with a draw-bar for locomotives, the strut and the draw-link jointed thereon, movable independently of each other, and arranged to operate as explained, and a supporting piece or block combined, substantially as and for the purposes set forth.

5. The saddle provided with the rollers and arranged to support and carry the rear end of the herein-described jointed draw-bar, substantially as shown and described.

6. The pendants suspended from the locomotive and provided with means, substantially as described, for adjusting the support for the rear end of the bar, substantially as and for the purposes explained.

7. In combination with the traveling saddle, the supporting-yoke and the pendants secured to the locomotive, said yoke being made adjustable upon the pendants, substantially as and for the purposes set forth.

8. In combination with the draw-bar, a draw-link jointed thereon and arranged, substantially as explained, so that the front end of said link is free to vibrate horizontally with the tender, for the purposes and objects set forth.

9. In combination with the draw-bar having the strut and draw-link jointed thereon, the buffer applied upon the tender and arranged, substantially as shown, to receive and transmit the thrust upon the strut or the draft upon the link, for the purposes and objects set forth.

10. In an attachment for locomotives, a draw-bar supported at its rear end in an adjustable traveling saddle and carrying a strut and draw-link, each jointed independently to said bar, and the whole combined and arranged to operate upon the tender in the manner and for the purposes set forth.

In testimony that we claim the foregoing we have hereunto set our hands in the presence of two witnesses.

THOS. B. PURVES.
THOS. C. CRAVEN.

Witnesses:
OLIVER HERBERT,
THOS. B. PURVES, Jr.